(12) United States Patent
Wang

(10) Patent No.: US 9,682,889 B2
(45) Date of Patent: Jun. 20, 2017

(54) TEMPERATURE-SENSITIVE ANTIFREEZING MATERIAL FOR ASPHALT PAVEMENT AND METHOD FOR PREPARING SAME

(71) Applicant: CHANGZHOU LVXIN ADVANCED MATERIAL TECHNOLOGY CO., LTD., Changzhou (CN)

(72) Inventor: Kun Wang, Changzhou (CN)

(73) Assignee: CHANGZHOU LVXIN ADVANCED MATERIAL TECHNOLOGY CO., LTD, Changzhou (CN)

( * ) Notice: Subject to any disclaimer, the term of this patent is extended or adjusted under 35 U.S.C. 154(b) by 0 days.

(21) Appl. No.: 15/317,124

(22) PCT Filed: Sep. 15, 2015

(86) PCT No.: PCT/CN2015/089609
§ 371 (c)(1),
(2) Date: Dec. 8, 2016

(87) PCT Pub. No.: WO2016/161763
PCT Pub. Date: Oct. 13, 2016

(65) Prior Publication Data
US 2017/0137323 A1 May 18, 2017

(30) Foreign Application Priority Data

Apr. 10, 2015 (CN) .......................... 2015 1 0168812

(51) Int. Cl.
| C09K 3/18 | (2006.01) |
|---|---|
| C04B 22/12 | (2006.01) |
| C04B 22/16 | (2006.01) |
| C04B 24/10 | (2006.01) |
| C04B 24/12 | (2006.01) |

(52) U.S. Cl.
CPC ............ *C04B 22/124* (2013.01); *C04B 22/16* (2013.01); *C04B 24/10* (2013.01); *C04B 24/126* (2013.01); *C09K 3/18* (2013.01)

(58) Field of Classification Search
CPC ....... C04B 22/124; C04B 22/16; C04B 24/08; C04B 24/10; C04B 24/126; C04B 24/32; C09K 3/18
See application file for complete search history.

(56) References Cited

FOREIGN PATENT DOCUMENTS

| CN | 101748675 | | 6/2010 |
|---|---|---|---|
| CN | 101787216 | | 7/2010 |
| CN | 102092978 | | 6/2011 |
| CN | 103865487 | | 6/2014 |
| CN | 104774592 | A * | 7/2015 |
| CN | 104829157 | | 8/2015 |

\* cited by examiner

*Primary Examiner* — Anthony J Green
(74) *Attorney, Agent, or Firm* — Treasure IP Group, LLC

(57) ABSTRACT

A temperature-sensitive anti-freezing material for asphalt pavement and a method for preparing same. A temperature-sensitive macro molecular organic matter is employed in the anti-freezing material instead of a traditional sustained release agent, and coated on the surface of the chloride particle having an anti-icing anti-freezing effect; and then the temperature-sensitive anti-freezing material for asphalt pavement is prepared by sieving and drying processes. The anti-freezing material can automatically respond to and control the release temperature of the chloride in the anti-freezing material according to the outside temperature, increase the anti-freezing effect duration of the chloride in the asphalt pavement effectively, and extend the service lifetime of the anti-freezing material.

8 Claims, 1 Drawing Sheet

TEMPERATURE-SENSITIVE ANTIFREEZING MATERIAL FOR ASPHALT PAVEMENT AND METHOD FOR PREPARING SAME

CROSS REFERENCE TO RELATED APPLICATION

This application is a National Phase application of, and claims priority to, PCT Application No. PCT/CN2015/089609, filed on Sep. 15, 2015 entitled "TEMPERATURE-SENSITIVE ANTIFREEZING MATERIAL FOR ASPHALT PAVEMENT AND METHOD FOR PREPARING SAME", which claims priority to Chinese Application No. 201510168812.1, filed on Apr. 10, 2015. Both the PCT Application and Chinese Application are incorporated herein by reference in their entireties.

BACKGROUND

Technical Field

The present invention relates to the technical field of anti-freezing and deicing of road pavements, and particularly to a temperature-sensitive anti-freezing material for asphalt pavements and a preparation method thereof.

Related Art

Transportation is an artery of the national economy, and plays an invaluable role in the development of the entire national economy. With the rapid development of China's economy, road traffic has become a lifeline of a modern city. However, the snow and ice in winter cause a greatly reduced adhesion coefficient of the vehicle's tire, resulting in frequent accidents and blocked road, thus reducing the road transport efficiency and causing loss of life and property. For the purpose of removing the snow and ice on the road in winter, passive technologies are mainly employed at home and abroad, including mechanical deicing and dusting of a deicing agent. However, the annual consumption of human and material resources is huge, and the generalization in a large scale is difficult.

Traditional methods for removing the snow and ice mainly include dusting of a deicing agent, or use of a working process in which mechanical devices, adjuvanted with manual efforts, are mainly used to clear the snow on the road pavement to achieve the purpose of snow melting and icing suppression. However, there are great limitations on these measures in terms of environmental protection, maneuverability, cost and others. For the sake of convenient, fast and efficient snow removal, an active de-icing technology includes adding an anti-freezing and de-icing material to the asphalt blend. The technology has the advantage of one-time pavement, long-term effectiveness, and low maintenance cost due to the effect of chlorides in the asphalt pavement of lowering the freezing point of the pavement, and thus is widely spread in Europe, Japan and other developed areas.

Although it is now possible to add chlorides to the asphalt pavement during the paving process, chlorides in the asphalt pavement material may be rapidly released and easily flee from the pavement due to long-term exposure of the asphalt pavement to wind and rain, particularly in a hot season, which leads to a less high chloride utilization in the pavement.

SUMMARY

The present invention is intended to solve the technical problem in the prior art of less high chloride utilization in anti-freezing and deicing of road pavements because chlorides in the asphalt pavement material may be rapidly released and easily flee from the pavement due to long-term exposure to wind and rain, particularly in a hot season.

To solve the above technical problem, the following technical solution is adopted in the present invention.

A temperature-sensitive anti-freezing material for asphalt pavements is provided, which is a granulated double layer composite material formed by coating a chloride as a core material with a temperature-sensitive agent as a coating.

The components of the composite material include, based on parts by weight, 75-95 parts of the chloride and 5-20 parts of the temperature-sensitive agent.

The chloride is one of sodium chloride, calcium chloride, and magnesium chloride, or a mixture of two or more thereof.

The temperature-sensitive agent has a composition comprising, based on percentage by weight, 6-10% of polyphenylene ether with a molecular weight of 2000, and 40-55% of polypropylene oxide with a molecular weight of 2000-6000, with the balance being glyceryl trilaurate.

Preferably, the temperature-sensitive sustained-release anti-freezing and deicing composite material for asphalt pavements further includes an anti-corrosive agent, that is, a rust inhibitor. The composite material is a granulated double layer composite material formed by coating a mixture of the chloride and the rust inhibitor as a core material with the temperature-sensitive agent as a coating.

The components of the composite material include, based on parts by weight 75-95 parts of the chloride, and 5-20 parts of the temperature-sensitive agent, where 0.01-0.5 part of sodium hexametaphosphate, 0.01-0.5 part of sodium gluconate, 0.01-0.5 part of monozinc phosphate, and 0.01-0.5 part of urea are present, and the sodium hexametaphosphate, sodium gluconate, monozinc phosphate, and urea constitute the rust inhibitor.

The chloride is one of sodium chloride, calcium chloride, and magnesium chloride, or a mixture of two or more thereof.

The temperature-sensitive agent has a composition comprising, based on percentage by weight, 6-10% of polyphenylene ether with a molecular weight of 2000, and 40-55% of polypropylene oxide with a molecular weight of 2000-6000, with the balance being glyceryl trilaurate.

The sodium hexametaphosphate used is a white powder, having a passing rate of over 85% through a 0.1 mm square hole screen.

The sodium gluconate is used is a white powder, having a passing rate of over 90% through a 0.1 mm square hole screen.

The monozinc phosphate is used a white powder, having a passing rate of over 85% through a 0.1 mm square hole screen.

The urea used is a white powder, having a passing rate of over 85% through a 0.1 mm square hole screen.

In the present invention, the granulated temperature-sensitive sustained-release anti-freezing and deicing composite material for asphalt pavement has a particle size of 0.1-6 mm.

The present invention further provides a method for preparing the temperature-sensitive sustained-release anti-freezing and deicing composite material for asphalt pavements, including the steps of:

(1) granulating a chloride (and a rust inhibitor) by an integrated granulation and coating machine, to obtain core material particles; and (2) formulating a temperature-sensitive agent into a solution; by using an injection and atomization device with compressed air as a driving force, atomizing the solution of the temperature-sensitive agent (in anhydrous organic solvent chloroform) and injecting it into the integrated granulation and coating machine, such that the atomized solution of the temperature-sensitive agent is reversely brought into contact with and evenly coated onto the surface of the core material particles obtained in Step (1), to form an uniform and dense polymer coating on the surface of the core material particles, drying by heating (at 65-80° C.) and hardening to form a film, and then cooling to obtain temperature-sensitive sustained-release anti-freezing and deicing composite material particles for asphalt pavements.

After coating, a film with a certain thickness is formed on the surface of the core material, which has a tight protection and isolation effect when the ambient temperature is above 0° C., and controls the dissolution of the core material. Moreover, the controlled-release coating is temperature sensitive. When the ambient temperature is below 0° C., such a dense protective film has action of slow release, such that the chloride is slowly released to the road surface, to form a layer of aqueous chloride, thereby lowering the freezing point of the pavement.

The composite material particles obtained above are sieved and dried, conveyed to a warehouse by means of a belt, and automatically packaged in a packing workshop.

In the present invention, the temperature-sensitive sustained-release anti-freezing and deicing composite material particles are blended into the asphalt pavement generally through a process below. During preparation of an asphalt concrete for pavement, the temperature-sensitive sustained-release anti-freezing and deicing composite material particles of the present invention are added. To a mixing tank for producing asphalt concrete, large and small aggregate, fine aggregate, straight aggregate, mineral powder, asphalt, and anti-freezing and deicing materials are added in sequence with stirring (in which the anti-freezing and deicing material accounts for 5-8% by weight of the asphalt concrete). The materials are discharged after the anti-freezing and deicing material is stirred in the mixing tank for 40 s. The anti-freezing and deicing material as white particles are invisible in the mixed product, suggesting that the anti-freezing and deicing material are evenly coated by asphalt.

The road construction process is similar to a conventional asphalt concrete construction process, and the porosity of the constructed road after the pavement process is ensured to be 3-5%.

The mechanism of action of the temperature-sensitive sustained-release anti-freezing and deicing composite material according to the present invention is as follows.

By adding the temperature-sensitive sustained-release anti-freezing and deicing composite material in surface course of the asphalt pavement, due to the roller compaction and friction from traveling vehicles and the osmotic pressure and capillarity of the pores in the pavement, the anti-freezing and deicing composite material is allowed to penetrate from different depths of the pavement to near the road surface and also has the effect of slow release of the chloride at a low temperature. The released chloride is contacted with the ice and snow on the road surface, and then rapidly dissolved in the snow water. As the concentration of chloride ions in the snow water increases, the vapor pressure of the water drops, while the solid vapor pressure of the ice is kept unchanged. In order to achieve a balanced solid-liquid vapor pressure of the ice-water mixture, the ice begins to melt. This can prevent and delay the icing of the asphalt pavement in winter.

The temperature-sensitive sustained-release anti-freezing and deicing composite material added with the rust inhibitor according to the invention is determined following GB/T 18175 "Determination of Corrosion Inhibition Performance of Water Treatment Agents-Rotation specimen method". Due to the addition of the high-performance rust inhibitor, the rust inhibitor component has the chemical property of forming a complex with metal ions. When contacted with a metal, complex reaction equilibrium occurs on the metal surface, forming a protective film to prevent the metal from being corroded, and thus effectively inhibiting the corrosion of the metal by the chloride. In addition, the rust inhibitor is further non-toxic, harmless, high soluble, environmentally friendly and pollution-free.

The present invention has the following benefits.

(1) Temperature-sensitive performance. Temperature-sensitive polymer materials are used in place of the traditional sustained-release materials for coating, which can achieve the effect of sustained-release, and allows the anti-freezing material to have a temperature-sensitive performance, thereby overcoming the problem of large ineffective release of the chloride in a hot season as a result of vigorous thermal motion of molecules, and extending the service life of the snow-melting asphalt pavement. At the same time, the asphalt pavement can prevent the road from freezing as a result of normal release at a low temperature.

(2) Adjustable anti-freezing temperature. The composition of chlorides in the anti-freezing materials can be adjusted and designed according to the temperature of the pavement in different areas in winter. For example, the content of calcium chloride in the core material can be increased appropriately in a region below −10° C., and the content of sodium chloride in the core material can be increased appropriately in a region at −10° C. or above.

(3) Adjustable sustained-release effect. According to the rainfall and the humidity of the pavement in different areas, the problem of too rapid ineffective release of chloride in a hot seasons is alleviated by adjusting the molecular weight of the temperature-sensitive polymer and the coating thickness.

(4) Environmental protection. The addition of a high-performance rust inhibito can reduce the corrosion of chloride released from the anti-freezing material on steel components of road bridges and the traveling vehicles without adversely affecting the environment.

(5) The temperature-sensitive anti-freezing material enables the asphalt pavement to have an extended anti-freezing effect, thereby reducing the dusting of a snow-melting agent and the use of shoveling snow and other maintenance measures in winter, ensuring the smooth traffic, and lowering the occurrence of accidents.

DETAILED DESCRIPTION

Example 1

Figure 1:
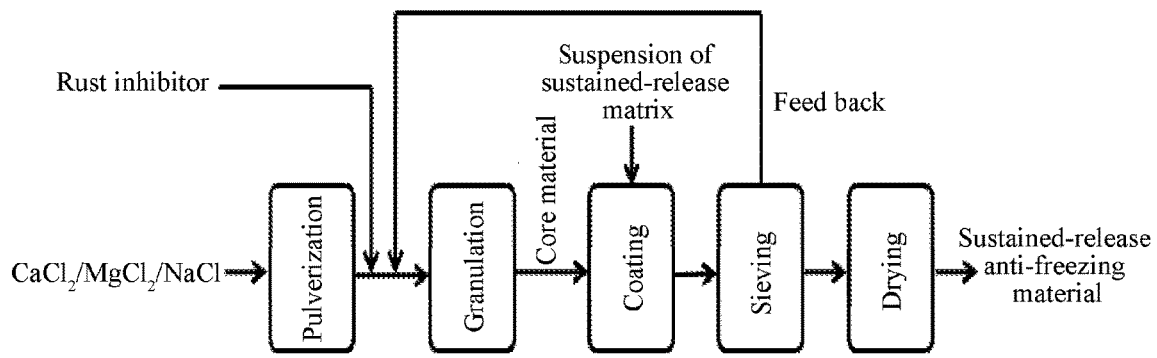
FIG. 1 is a process flow chart of preparing a temperature-sensitive sustained-release anti-freezing and deicing composite material for asphalt pavements according to the present invention.

80 g sodium chloride, 10 g calcium chloride, 1 g rust inhibitor (0.3 g sodium hexametaphosphate, 0.2 g sodium gluconate, 0.2 g monozinc phosphate, and 0.3 g urea), and 9 g temperature-sensitive agent (having a composition including, based on percentage by weight, 6% of polyphenylene ether with a molecular weight of 2000, and 45% of polypropylene oxide with a molecular weight of 2000, with the balance being glyceryl trilaurate) were weighed.

(1) The calcium chloride was pulverized, and mixed uniformly with sodium chloride, to obtain a chloride mixture. The rust inhibitor was dissolved to formulate a 30 wt % aqueous solution. The aqueous solution of the rust inhibitor was sprayed onto the chloride mixture by using a metering pump, and granulated by an integrated granulation and coating machine, to obtain core material particles having a particle size of 2.5 mm.

(2) By using an injection and atomization device with compressed air as a driving force, a solution of the temperature-sensitive agent was atomized and injected into the integrated granulation and coating machine. The atomized solution of the temperature-sensitive agent is reversely brought into contact with and evenly coated onto the surface of the core material particles obtained in Step (1), to form a uniform and dense polymer coating with a thickness of 0.1 mm on the surface of the core material particles. The coating was dried by heating at 75° C. for 1.5 hrs and hardened to form a film. After cooling, temperature-sensitive sustained-release anti-freezing and deicing composite material particles for asphalt pavements were obtained.

Example 2

75 g sodium chloride, 15 g calcium chloride (rust inhibitor: 0.2 g sodium hexametaphosphate, 0.3 g sodium gluconate, 0.2 g monozinc phosphate, and 0.3 g urea), and 9 g temperature-sensitive agent (having a composition including, based on percentage by weight, 8% of polyphenylene ether with a molecular weight of 2000, and 50% of polypropylene oxide with a molecular weight of 2000, with the balance being glyceryl trilaurate) were weighed.

The preparation method was as described in Example 1.

Example 3

80 g sodium chloride, 15 g calcium chloride (rust inhibitor: 0.2 g sodium hexametaphosphate, 0.3 g sodium gluconate, 0.2 g monozinc phosphate, and 0.3 g urea), and 14 g temperature-sensitive agent (having a composition including, based on percentage by weight, 6% of polyphenylene ether with a molecular weight of 2000, and 48% of polypropylene oxide with a molecular weight of 2000, with the balance being glyceryl trilaurate) were weighed.

The preparation method was as described in Example 1.

Example 4

75 g sodium chloride, 15 g calcium chloride, and 9 g temperature-sensitive agent (having a composition including, based on percentage by weight, 6% of polyphenylene ether with a molecular weight of 2000, and 45% of polypropylene oxide with a molecular weight of 2000, with the balance being glyceryl trilaurate) were weighed.

(1) The calcium chloride was pulverized, mixed uniformly with sodium chloride, and granulated by an integrated granulation and coating machine, to obtain core material particles having a particle size of 2.5 mm.

(2) By using an injection and atomization device with compressed air as a driving force, a solution of the temperature-sensitive agent was atomized and injected into the integrated granulation and coating machine. The atomized solution of the temperature-sensitive agent is reversely brought into contact with and evenly coated onto the surface of the core material particles obtained in Step (1), to form a uniform and dense polymer coating with a thickness of 0.1 mm on the surface of the core material particles. The coating was dried by heating at 75° C. for 1.5 hrs and hardened to form a film. After cooling, temperature-sensitive sustained-release anti-freezing and deicing composite material particles for asphalt pavements were obtained.

Experiment 1—Rate of corrosion of temperature-sensitive sustained-release anti-freezing and deicing composite material according to the present invention on carbon steel The determination was carried out following GB/T 18175. The determination result is expressed as annual average corrosion depth in mm/a (which is an average of the measurements of two specimens).

The temperature-sensitive sustained-release anti-freezing and deicing composite material particles obtained in Examples 1, 2, 3, and 4 were respectively dissolved in water completely, to formulate an 18 wt % solution.

Pure water, aqueous sodium chloride solution, aqueous magnesium chloride solution, aqueous calcium chloride solution were used as a control, where the aqueous sodium chloride solution, the aqueous magnesium chloride solution, and the aqueous calcium chloride solution 3 have the same chloride ion concentration, which is an average of the chloride ion concentrations in the aqueous solutions formulated with the four products obtained in Examples 1, 2, 3, and 4 (for ease of comparison, the chloride ion concentrations in the aqueous solutions formulated with the four products obtained in Examples 1, 2, 3, and 4 are close, and by means of such a design, the chloride ion concentration in the 3 control solutions are substantially equivalent to those in the solutions formulated with the products of the present invention).

Determination Conditions:

(1) The standard corrosion test specimen used is 20# carbon steel (GB/T 699) having a surface area of 28 cm$^2$.

(2) The proportion of the solution volume to the area of the test specimen is 24 mL/cm$^2$.

(3) The determination temperature is 40° C.

(4) The test cycle is 48 h;

(5) No air is bubbled through the solution determined.

The result of comparison is shown in Table 1.

TABLE 1

Determination result of corrosion rate of carbon steel

| Item | Corrosion rate of carbon steel mm/a |
|---|---|
| Pure water | 0.05849 |
|  | 0.06876 |

TABLE 1-continued

Determination result of corrosion rate of carbon steel

| Item | Corrosion rate of carbon steel mm/a |
|---|---|
| Sodium chloride solution | 0.660978 |
| | 0.685211 |
| Magnesium chloride solution | 0.598306 |
| | 0.575744 |
| Calcium chloride solution | 0.478812 |
| | 0.487168 |
| Solution of Example 1 | 0.03695 |
| | 0.03585 |
| Solution of Example 2 | 0.03240 |
| | 0.03123 |
| Solution of Example 3 | 0.03093 |
| | 0.03135 |
| Solution of Example 4 | 0.39482 |
| | 0.40268 |

Figure 2:
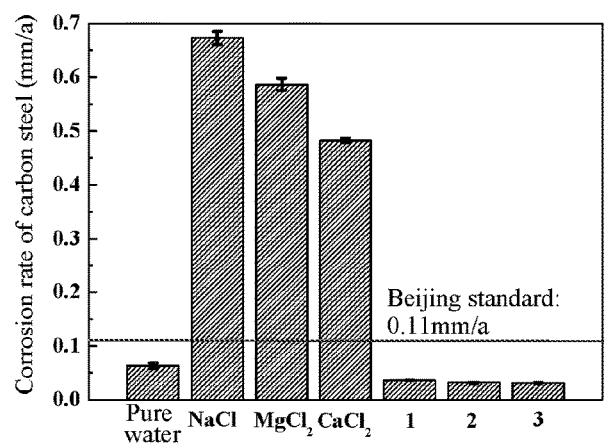
FIG. 2 compares the corrosion rates with temperature-sensitive sustained-release anti-freezing and deicing composite materials for asphalt pavements obtained in Examples 1, 2, and 3.

FIG. 2 is a coordinate graph showing the experimental result (except for the data corresponding to the solution obtained in Example 4). It can be concluded that the addition of a high-performance rust inhibitor causes the rate of corrosion of the anti-freezing and deicing on carbon steel to decrease greatly, and the index to corrosion rate is better than the national standard GB/T23851-2009 Road deicing and snow-melting agent and local standard of Beijing DB 11/T161-2012 Snow-melting agent.

Experiment 2—Test of hardness of the anti-freezing and deicing material according to the present invention Experimental instrument: Particle strength tester (manufactured by FUJIWARA SCIENTIFIC CO., LTD)

Test Steps

The particle strength tester was reset, such that the indication rod is positioned at a zero point. The temperature-sensitive sustained-release anti-freezing and deicing composite material particles of the present invention were sampled at random, and radically placed on a bearing seat. Then a lever was rotated clockwise, upon which a pressure indicator will rotate with the indication rod in a pressure display disc. When the pressure was gradually increased until the particles were crushed, the pressure indicator returned to zero, and the position where the pressure indication rod resides were the particle strength. 10 particles (with a particle size of 2.5 to 3 mm) were randomly taken from the particle samples in Examples 1, 2 and 3 and determined as described above. A minimum value and a maximum value were discarded, and an average of the remaining hardness measurements is the strength of the anti-freezing and deicing material. The test result is shown in Table 2.

TABLE 2

Test of hardness of the anti-freezing and deicing agent

| Item | Hardness index, N |
|---|---|
| Example 1 | 55.5 |
| Example 2 | 65.8 |
| Example 3 | 58.7 |
| Comparative Example 1 (granulation with chloride mixture) | 23.6 |
| Comparative Example 2 (granulation with chloride mixture) | 27.1 |
| Example 4 | 29.8 |

In the table above, the preparation method in "Comparative Example 1 (granulation with chloride mixture)" was as follows. 75 g sodium chloride and 15 g calcium chloride were weighed. The calcium chloride was pulverized, and mixed uniformly with sodium chloride, to obtain a chloride mixture. The mixture was granulated by an integrated granulation and coating machine (the granulation process was the same as that in Step (1) of Example 2).

In the table above, the preparation method in "Comparative Example 2 (granulation with chloride mixture)" was as follows.

75 g sodium chloride and 15 g calcium chloride (rust inhibitor: 0.2 g sodium hexametaphosphate, 0.3 g sodium gluconate, 0.2 g monozinc phosphate, and 0.3 g urea) were weighed. The calcium chloride was pulverized, and mixed uniformly with sodium chloride, to obtain a chloride mixture. The rust inhibitor was dissolved to formulate a 30 wt % aqueous solution. The aqueous solution of the rust inhibitor was sprayed onto the chloride mixture by using a metering pump, and granulated by an integrated granulation and coating machine (the granulation process was the same as that in Step (1) of Example 2).

It can be seen from the data (through comparison with Comparative Examples 1 and 2) in Table 2 that the addition of the rust inhibitor contributes to the increased hardness of the particles of the chloride mixture, but to a limited extent. Likewise, it can be seen through comparison of the data of Comparative Example 1 with Example 4 that coating the particles of the chloride mixture with the temperature-sensitive agent can also increase the hardness of the composite material to some extent; however, the particles are still loose. Only when the "addition of rust inhibitor" and "coating with the temperature-sensitive agent" are used in combination, the hardness of the particles can be increased greatly. This can be attributed to the synergism of the two modification means. Therefore, the "addition of rust inhibitor" can not only provide an anti-corrosion effect, but also promote the increase of the hardness of the coated particles.

The temperature-sensitive sustained-release anti-freezing and deicing composite material particles of the present invention has a high hardness, which can effectively prevent the damage caused during stirring in an asphalt mixing tank, and the fragmentation caused by roller compaction by a heavy mechanical equipment during paving.

Experiment 3—Road deicing effect of the temperature-sensitive sustained-release anti-freezing and deicing composite material of the present invention The anti-freezing and deicing composite material obtained in Example 1 was blended to an asphalt mixture in an amount of 5-8 weight %, and uniformly mixed. The obtained product was designated as asphalt mixture 1.

The asphalt mixture without the anti-freezing and deicing composite material was designated as asphalt mixture 2.

The asphalt mixtures 1 and 2 were respectively prepared into a rutting specimen 1 and 2, on which water was sprinkled. Then the specimens were frozen for 8 hrs in a cryostat chamber at −10° C. The test result shows that no icing occurs at the surface of the surface course of the asphalt mixture added with the anti-freezing and deicing material, and obvious icing occurs to the surface course of the asphalt mixture without the anti-freezing and deicing material.

The temperature in the cryostat chamber was sequentially adjusted to −8° C., −5° C., −2° C., and 0° C., to detect whether icing occurs on the rutting specimens 1 and 2 sprinkled with water at relevant ambient temperatures. The experimental steps were as described above. The result shows that no icing occurs at the surface of the surface course of the asphalt mixture added with the anti-freezing and deicing material, and obvious icing occurs to the surface course of the asphalt mixture without the anti-freezing and deicing material.

The experimental result suggests that the anti-freezing and deicing material prepared in the present invention has an active effect of preventing the asphalt pavement from icing at −10-0° C.

Experiment 4—Temperature-sensitive sustained release effect of the anti-freezing and deicing composite material according to the present invention According to HG/T3931-2007 Industrial standard of controlled-release fertilizer, test of chloride release rate over 3 days was conducted on coated and uncoated anti-freezing materials (where the uncoated anti-freezing material refers to the core material particles) prepared in Example 3 at 30° C., 20° C., 10° C., 0° C., and −10° C. Experimental result is shown below.

TABLE 3

| Temperature/° C. | uncoated anti-freezing material Chloride release rate over 3 days/% | Coated anti-freezing material Chloride release rate over 3 days/% |
|---|---|---|
| 30 | 95.2 | 3.2 |
| 20 | 94.4 | 3.1 |
| 10 | 93.5 | 3.0 |
| 0 | 67.2 | 63.5 |
| −10 | 54.3 | 49.3 |

The chloride release rate over 3 days is the proportion of the cumulative weight of chloride released from the anti-freezing material over 3 days to initial weight.

It can be known through analysis of the experimental data above that the temperature-sensitive anti-freezing material of the present invention has obvious temperature-sensitive sustained release effect compared with uncoated chloride core material particles. At 10-30° C., the release rate of the temperature-sensitive coated chloride is far less than that of the uncoated chloride core material particles. At −10-0° C., the temperature-sensitive coated chloride is released normally, at a rate that is substantially at the same order of magnitude with that of the uncoated chloride particles. Therefore, the temperature-sensitive anti-freezing material of the present invention has anti-freezing and deicing functions.

What is claimed is:

1. A temperature-sensitive anti-freezing material for asphalt pavements, which is a granulated double layer composite material formed by coating a chloride as a core material with a temperature-sensitive agent as a coating, wherein the components of the composite material comprise, based on parts by weight, 75-95 parts of the chloride and 5-20 parts of the temperature-sensitive agent,
    wherein the temperature-sensitive agent has a composition comprising, based on percentage by weight, 6-10% of polyphenylene ether with a molecular weight of 2000, and 40-55% of polypropylene oxide with a molecular weight of 2000-20000, with the balance being glyceryl trilaurate.

2. The temperature-sensitive anti-freezing material for asphalt pavements according to claim 1, wherein the granulated double layer composite material has a particle size of 0.1-6 mm.

3. The temperature-sensitive anti-freezing material for asphalt pavements according to claim 1, wherein the chloride is one of sodium chloride, calcium chloride, and magnesium chloride or a mixture of two or more thereof.

4. A method for preparing the temperature-sensitive anti-freezing material for asphalt pavements according to claim 1, comprising the steps of
    (1) making granulates of a chloride by an integrated granulation and coating machine, to obtain core material particles; and
    (2) formulating a temperature-sensitive agent into a solution; by using an injection and atomization device with compressed air as a driving force, atomizing the solution of the temperature-sensitive agent and injecting it into the integrated granulation and coating machine, such that the atomized solution of the temperature-sensitive agent is reversely brought into contact with and evenly coated onto the surface of the core material particles obtained in Step (1), to form an uniform and dense polymer coating on the surface of the core material particles; drying by heating and hardening to form a film, and then cooling to obtain temperature-sensitive anti-freezing material particles for asphalt pavements.

5. A temperature-sensitive anti-freezing material for asphalt pavements, which is a granulated double layer composite material formed by coating a mixture of a chloride and a rust inhibitor as a core material with a temperature-sensitive agent as a coating, wherein
    the components of the composite material comprise, based on parts by weight, 75-95 parts of the chloride, and 5-20 parts of the temperature-sensitive agent, where 0.01-0.5 part of sodium hexametaphosphate, 0.01-0.5 part of sodium gluconate, 0.01-0.5 part of monozinc phosphate, and 0.01-0.5 part of urea are present, and
    the sodium hexametaphosphate, sodium gluconate, monozinc phosphate, and urea constitutes the rust inhibitor; and
    the temperature-sensitive agent has a composition comprising, based on percentage by weight, 6-10% of polyphenylene ether with a molecular weight of 2000, and 40-55% of polypropylene oxide with a molecular weight of 2000-6000, with the balance being glyceryl trilaurate.

6. The temperature-sensitive anti-freezing material for asphalt pavements according to claim 5, wherein the granulated double layer composite material has a particle size of 0.1-6 mm.

7. The temperature-sensitive anti-freezing material for asphalt pavements according to claim 5, wherein the chloride is one of sodium chloride, calcium chloride, and magnesium chloride or a mixture of two or more thereof.

8. A method for preparing the temperature-sensitive anti-freezing material for asphalt pavements according to claim 5, comprising the steps of
    (1) mixing a chloride and a rust inhibitor uniformly, and making granulates by an integrated granulation and coating machine, to obtain core material particles;
    (2) formulating a temperature-sensitive agent into a solution; by using an injection and atomization device with compressed air as a driving force, atomizing the solution of the temperature-sensitive agent and injecting it into the integrated granulation and coating machine, such that the atomized solution of the temperature-sensitive agent is reversely brought into contact with and evenly coated onto the surface of the core material particles obtained in Step (1), to form an uniform and dense polymer coating on the surface of the core material particles; drying by heating and hardening to form a film, and then cooling to obtain temperature-sensitive anti-freezing material particles for asphalt pavements.

* * * * *